US010079793B2

(12) United States Patent
Tekin et al.

(10) Patent No.: US 10,079,793 B2
(45) Date of Patent: Sep. 18, 2018

(54) WIRELESS CHARGING SMART-GEM JEWELRY SYSTEM AND ASSOCIATED CLOUD SERVER

(71) Applicants: Ahmet Tekin, Irvine, CA (US); Ahmed Emira, Irvine, CA (US)

(72) Inventors: Ahmet Tekin, Irvine, CA (US); Ahmed Emira, Irvine, CA (US)

(73) Assignee: WAVEWORKS INC., Irvine, CA (US)

( * ) Notice: Subject to any disclaimer, the term of this patent is extended or adjusted under 35 U.S.C. 154(b) by 147 days.

(21) Appl. No.: 14/795,049

(22) Filed: Jul. 9, 2015

(65) Prior Publication Data
US 2017/0012925 A1 Jan. 12, 2017

(51) Int. Cl.
*H04L 12/58* (2006.01)
*A44C 17/00* (2006.01)
*H02J 7/35* (2006.01)

(52) U.S. Cl.
CPC ............ *H04L 51/32* (2013.01); *A44C 17/007* (2013.01); *H02J 7/35* (2013.01)

(58) Field of Classification Search
CPC ....... H04L 67/10; H04L 67/141; H04L 67/18; H04L 43/04; H04L 43/065; H04L 43/0876; H04L 61/1511; H04L 67/327; H04L 43/062; H04L 43/0817; H04L 67/02; H04L 41/12; H04L 47/125; H04L 47/24; H04L 67/12; H04L 67/125; H04L 67/22; H04L 67/42; H04W 4/008; G06Q 10/10; G06F 17/30876
See application file for complete search history.

(56) References Cited

U.S. PATENT DOCUMENTS

| 5,798,907 | A | 8/1998 | Janik |
| 6,308,891 | B1 | 10/2001 | Regev |
| 6,433,483 | B1 * | 8/2002 | Michael ............ A44C 15/0015 315/200 A |
| 6,801,140 | B2 | 10/2004 | Mantyjarvi et al. |
| 7,206,429 | B1 * | 4/2007 | Vossler ............... H04R 1/1033 181/130 |

(Continued)

FOREIGN PATENT DOCUMENTS

WO WO 2014078450 A1 5/2014

OTHER PUBLICATIONS

Nicola Carta, Acquisition Systems and Decoding Algorithms of Peripheral Neural Signals for Prosthetic Applications, 2013, All pages (Year: 2013).*

*Primary Examiner* — Ninos Donabed
(74) *Attorney, Agent, or Firm* — Oktay Enterprises Int'l., LLC; Sevgin Oktay (57) ABSTRACT

Wireless Charging Smart-Gem Jewelry System and Associated Cloud Server comprising a wearable electronic gemstone capable of sensing the emotional state and bodily vital signs of the user and being wirelessly charged and a mobile device capable of communicating with the electronic gemstone such that a cloud server manages communications between members of a social network wearing the electronically smart gemstone. The disclosed Jewelry System provides a custom gemstone with symbol-carved light effects, wireless charging of the stone electronics through universal audio jack of any mobile device, and electrical stimulation of the user along with visual triggers as a specific mode of social interaction.

10 Claims, 8 Drawing Sheets

(56) References Cited

U.S. PATENT DOCUMENTS

| | | | |
|---|---|---|---|
| 8,450,938 B2* | 5/2013 | Mills | H05B 33/0812 |
| | | | 315/224 |
| 8,676,937 B2* | 3/2014 | Rapaport | H04L 51/32 |
| | | | 709/219 |
| 9,031,273 B2 | 5/2015 | Dong et al. | |
| 2003/0046228 A1 | 3/2003 | Berney | |
| 2008/0039677 A1* | 2/2008 | Adams | A61N 2/06 |
| | | | 600/13 |
| 2009/0293540 A1* | 12/2009 | Clark | A44C 5/0023 |
| | | | 63/1.13 |
| 2010/0198322 A1* | 8/2010 | Joseph | A61F 7/007 |
| | | | 607/108 |
| 2011/0209501 A1 | 9/2011 | Scott | |
| 2012/0209745 A1* | 8/2012 | Spencer, II | G06Q 20/327 |
| | | | 705/26.41 |
| 2012/0319590 A1* | 12/2012 | Mills | H05B 33/0812 |
| | | | 315/130 |
| 2013/0088329 A1 | 4/2013 | Chrysostom et al. | |
| 2013/0093590 A1 | 4/2013 | Sivalingam | |
| 2013/0169513 A1 | 7/2013 | Heinrich et al. | |
| 2013/0303087 A1* | 11/2013 | Hauser | H04W 4/008 |
| | | | 455/41.2 |
| 2013/0311132 A1 | 11/2013 | Hiroaki Tobita | |
| 2014/0058192 A1* | 2/2014 | van Rijn | A61M 21/00 |
| | | | 600/26 |
| 2014/0078450 A1 | 3/2014 | Yang et al. | |
| 2014/0116085 A1 | 5/2014 | Lam | |
| 2014/0129703 A1* | 5/2014 | Patel | G06Q 30/0625 |
| | | | 709/224 |
| 2014/0260424 A1* | 9/2014 | Warren | A44C 17/0233 |
| | | | 63/1.13 |
| 2014/0366123 A1 | 12/2014 | DiBona | |
| 2015/0052253 A1* | 2/2015 | Johnson | H04L 61/1511 |
| | | | 709/226 |
| 2015/0087925 A1 | 3/2015 | Pedley | |
| 2015/0106398 A1* | 4/2015 | Tomlinson | G06F 17/30259 |
| | | | 707/769 |
| 2015/0358444 A1* | 12/2015 | Mercando | H04M 1/7253 |
| | | | 455/41.1 |
| 2016/0127641 A1* | 5/2016 | Gove | G06T 1/0007 |
| | | | 348/143 |

* cited by examiner

WIRELESS CHARGING SMART-GEM JEWELRY SYSTEM AND ASSOCIATED CLOUD SERVER

BACKGROUND

All references cited in this specification, and their references, are incorporated by reference herein where appropriate for teachings of additional or alternative details, features, and/or technical background.

Figure 1:
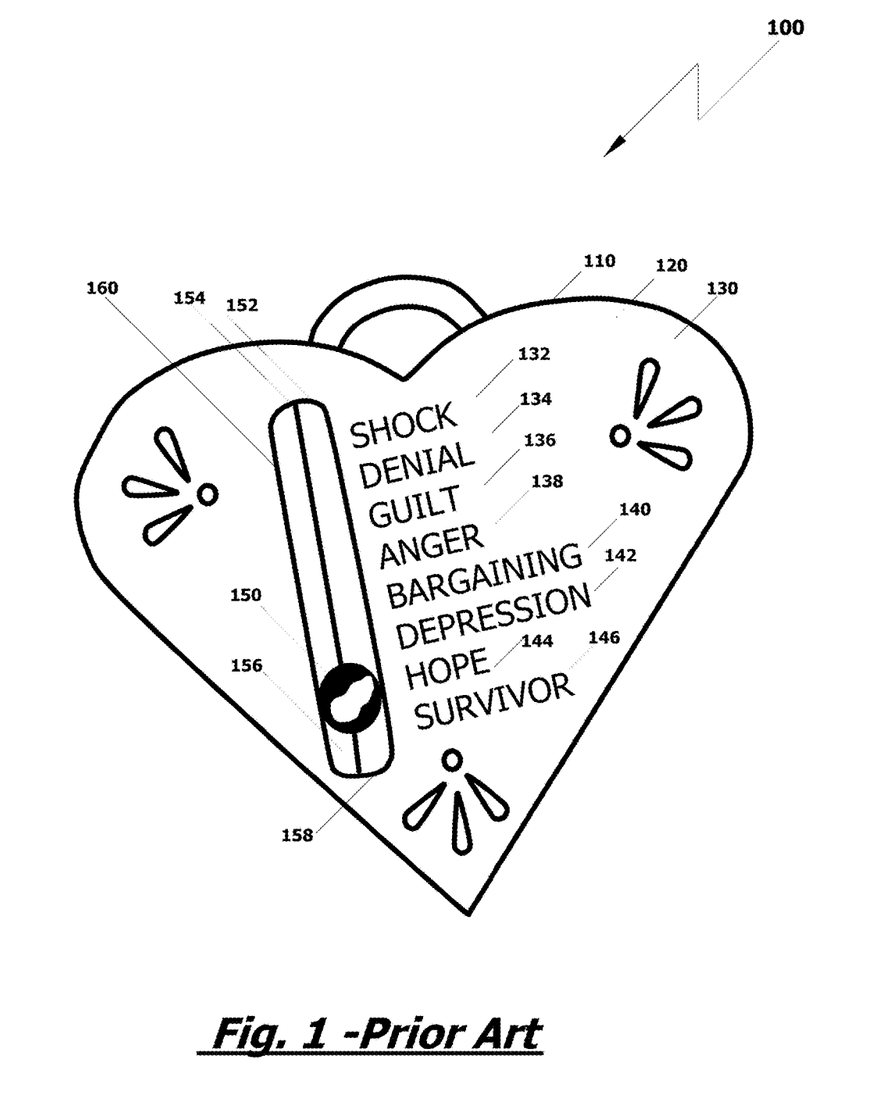
FIG. 1 shows a jewelry system displaying a plurality of emotional states of a user according to prior art.

Disclosed is a smart jewelry system as distinguished from common jewelry systems some of which are even capable of expressing a user's emotional state albeit through manual manipulation of certain parts of the system. Among them is "Jewelry System and Method for Expressing Emotional State" described by Anita Scott in her US Patent Publication No: 2011/0209501 A1 as follows:

The jewelry system 100 shown in FIG. 1 includes a body member 110 having a front 120 and a back face 130 (shown facing the reader) oppositely disposed to the front face 120, where various emotional states are shown. For illustrative purposes, back face 130 is shown here indicating in detail the various emotional states. When in use, back surface 130 rests on user's body (not shown) while front surface 120 rests away from the user's person; thus, front surface 120 is viewable by the general public. As such, front surface 120 can include attractive and decorative designs such as floral design. Noting however that body member 110 can also be worn such that front surface 120 rests on the user's body, while back surface 130 is away from the user's person, thus viewable by the public. The position of a bead 150 as explained further below expresses the user's current emotional state to the general public. The jewelry system further includes one or more detachable charms (not shown) reflecting one's love or grief for someone.

As Anita Scott describes in detail, the grief stages are listed in the order of occurrence below each other on surface 130. Here, the first grief stage is shock 132. The next grief stage is denial 134 (below shock 132). Denial 134 is followed by guilt 136. Guilt 136 is followed by anger 138, bargaining 140, depression 142, hope 144, and finally survivor 146. The emotional states shown are not exhaustive, according to Anita. Other emotional states can be displayed. Back surface 130 also comprises a means for selecting any one of the plurality of emotional states. Specifically, said means is bead of acknowledgment system 160. Bead of acknowledgment system 160 comprises pin 154 and smart bead 150. A smart bead has a silicone lining through an aperture (not shown). The silicone allows the smart bead to clutch onto pin 154. In this manner, smart bead 150 is maneuverable along pin 154 and remains in place when positioned by the user. User can move smart bead 150 upwards and downwards along pin 154 according to the user's current emotional state. Pin 150 is itself incorporated at its proximal end 158 and its distal end 152 into a contiguous groove or channel 156. In operation, the user wishing to utilize the system described begins by grasping jewelry system 100 in the palm of one hand. Here, if user is unfamiliar with the various grief stages, the user can slide smart bead 150 along pin 160 to study each of the various stages. In this manner, the system can assist users to become aware of the various grief stages and at what stage they might possibly be.

Prior art as shown in the References below, provides examples of many other types of wearable devices for the purposes for not only expressing one's emotions but also for monitoring activities at a body surface, and for that matter, changing the artistic appearance of jewelry worn on a body surface electronically. In contribution to these endeavors, a smart jewelry system disclosed herein and described further below in Detailed Description section provides a culmination of various wearable aspects into a single device capable of performing a plethora of expressive functions into a single electronic unit.

REFERENCES

U.S. Pat. No. 6,801,140 B2 discloses a system and method for wearable electronic devices and smart clothing that includes integrating an electronic circuit into one or more fastening devices on an article of clothing. One or more electronic devices integrated with or attached to the clothing are controlled or monitored based on a position of the fastening device where the position relates to how much the fastening device is fastened.

US Publication 20150087925 describes a contact sensor and system for incorporation within clothing and other wearable items to monitor activity at a body surface. The sensor includes a contact membrane having a body surface contacting area and one or more base layers of knitted fabric. The base layer(s) is thicker over an area congruent with the body surface contacting area of the contact membrane. As a result, the contact membrane is urged into the forming of a raised outer surface for projection against a body surface.

US Publication 20140366123 shows systems and techniques are disclosed for detecting whether a wearable computing device is worn by a user or not. The detection can be made based on whether the device is secured to a user or based on a sensor. A device worn by a user may be operated in a private mode such that the user wearing the device is provided information that is useful while wearing the device. For example, the user may receive message notifications, news updates, telephone call information, or the like. A wearable computing device maybe operated in a public mode while not being worn by a user. While in the public mode, the device may provide non user specific information such as a current time, media items, or the like.

US Publication 2013/0311132 yet another wearable computing device, comprising a wig that is adapted to cover at least a part of a head of a user, at least one sensor for providing input data, a processing unit that is coupled to the at least one sensor for processing said input data, and a communication interface that is coupled to the processing unit for communicating with a second computing device. The at least one sensor, the processing unit and the communication interface are arranged in the wig and at least partly covered by the wig in order to be visually hidden during use.

U.S. Pat. No. 5,798,907 describes a wearable computing device including at least one computing-device component module and flexible circuitry operably connected to the module. The module includes a top module portion, a bottom module portion, and at least one protrusion for holding the top module portion in substantially fixed relationship with the bottom module portion. The protrusion passes into and/or through the flexible circuitry. A plurality of such modules is also contemplated.

US Publication 20110209501 A1 shows a jewelry system and teaches a method for expressing a user's emotional state. The jewelry system includes a body member having various emotional states that are visible on its face. The jewelry system also includes a smart bead for selecting any one of the emotional states. The selected emotional state expresses the user's current emotional state to the general public. The jewelry system further includes one or more detachable charms namely an affected loved one charm and a cause of grief charm US Publication US 2013/0093590 A1 discloses a jewelry item to which a location tracking module can be attached. The location tracking module could use a GPS circuit or a GPS circuit. A geo fence is defined around the jewelry item. If the jewelry is taken out of the geo fence, a message or an alarm may be sent to specified phone numbers and email IDs.

U.S. Pat. No. 6,308,891 B1 discloses a jewelry piece including a jewelry substrate having a recess formed therein, and an identification device, having detectable identification data formed thereon, disposed in the recess.

US Patent 2013/0088329 A1 shows a smart bracelet system having a first smart bracelet and second smart bracelet. The first smart bracelet comprises a first bracelet body having a first inner volume; a first attacher; a first pocket; a first powerer; a first chip; and a first illuminator. The second smart bracelet comprising; a second bracelet body having a second inner volume; a second attacher; a second pocket; a second powerer; a second chip; and a second illuminator. The first smart bracelet and the second smart bracelet are in communication with one another. The communication uses electromagnetic waves useful to enable communication between the bracelet during periods of darkness; thus tracking means are presented.

US Publication 2003/0046228 A1 shows a user-wearable electronic wireless transaction apparatus. The user-wearable electronic wireless transaction apparatus comprises a housing which houses a wireless communication device, one or more electronic circuits, a power source, a display device and a biometric data reading device. While enabled as a timepiece or performing other functions suitable to a user-wearable apparatus, the apparatus can establish wireless communication with a counterpart communication apparatus in order to conduct a transaction. The biometric data reading device can read the user's applicable biometric data and then transmit a user identity validation and the wireless communication device can transmit user authorization for the transaction.

US Publication 2014/0116085 A1 discloses a wearable communication device including a necklace having an integrated first power source, and a telecommunications device having a transceiver configured to allow wireless communication, wherein the telecommunications device is configured to couple and decouple with the necklace, and wherein the telecommunications device is configured to receive power from the first power source when coupled with the necklace.

SUMMARY

Aspects disclosed herein include
a Wireless Charging Smart-Gem Jewelry System and Associated Cloud Server comprising an electronic gemstone having a front side and an opposing backside, the backside carved to receive electronic components with capability to flash signals of pre-defined forms through said front side while the backside is sealed; a plurality of electronic devices paired with at least one or more of the electronic gemstones; an application software program loaded onto the plurality of electronic devices with instructions to recognize and ping the at least one or more of the electronic gemstones; a cloud server having a traffic control program for directing ping traffic emanating from the plurality of electronic devices; a wireless charger capable of wirelessly charging the electronic gemstone by mating with the electronic devices; wherein the at least two or more of the electronic gemstones and the paired plurality of electronic devices directed by a cloud server form a social network system where groups of users of the electronic gemstones can communicate to each other their feelings through flashing emoticons as well as through electro-stimulation achieved by sensory bi-phasic neural stimulus waveforms that are generated through electronics embedded in said Smart-Gem Jewelry; wherein the charger is a portable jewelry storage box capable of mating with the mobile device to wirelessly charge the electronic gemstone placed inside the sotorage box; and wherein the pre-defined forms comprise a multi-layered combination of two or more icons being lit up simultaneously representing membership in a specific group within a general membership.

A Wireless Charging Smart-Gem Jewelry System & Associated Cloud Server comprising an electronic gemstone capable of displaying body state of a user through electrical stimulation; a mobile device capable of communicating with the electronic gemstone; a charger capable of charging the electronic gemstone; and a cloud server that manages communications between at least two or more of the gemstones.

BRIEF DESCRIPTION OF DRAWINGS

FIG. 3-a shows the presently disclosed Smart-Gem hooked to a bracelet as jewelry.

FIG. 3-b shows the electronic subassembly of the presently disclosed Smart-Gem, including inset FIG. 3-c which shows a bi-phasic waveform (395 in cloud 390).

FIGS. 4-a through 4-c show the presently disclosed Smart-Gem hooked or formed on a ring, necklace and expandable men's bracelet, respectively, in un-pinged or dimmed mode.

FIGS. 4-d through 4-f show the presently disclosed Smart-Gem hooked or formed on a ring, necklace and expandable men's bracelet, respectively, in pinged or lit-up mode.

FIGS. 5-a through 5-c show the presently disclosed Smart-Gem hooked or formed on a ring, necklace and expandable men's bracelet, respectively, owned by members of a particular group having the same logo in a pinged or connected mode.

FIGS. 5-d through 5-f show the presently disclosed Smart-Gem hooked or formed on a ring, necklace and expandable men's bracelet, respectively, owned by members of a different group having the same logo in a pinged or connected mode.

DETAILED DESCRIPTION

In embodiments there is illustrated
a smart jewelry system comprising an electronic/smart gemstone configured to pair with a mobile device to connect with loved ones or fans through an application specific traffic management cloud system capable of pinging specifically designated devices. The smart gemstone is personalized with customized logo and symbol carvings such that the gemstone is capable of emotionally connecting wirelessly with a social network of two or more related people such as family, friends, and fans of a team having a carving on the semi-transparent smart gemstone worn by the same group of people that comprise the users of the cloud system server. When a user of the application software pings the other user or users wearing or carrying the disclosed semi-transparent or translucent smart-gem equipped with electronic Light-Emitting-Diodes (LEDs) special light effect blinks a pattern on the gem of the worn with a wireless communication command from the proximately receiving mobile communication devices such as tablets or cell phones. In addition to light patterns, the electronics embedded in the smart gemstone can inject electro-neural signals into the two point contact electrodes protruding from the backside of the gemstone and making contact with the body of the wearer when pinged by a faraway pinging party. For illustrative purposes then, consider soccer team Barcelona scores a goal. With a ping generated by the bodily sensations generated of a soccer club member watching the game to club of jewelry wearer's network, the bodies of those members of the same club actively wearing the disclosed Smart-Gem jewelry would be triggered with the electro-neurological signal patterns in such a way so as to feel the same sensational impulses in addition to observing special light effects on their jewelry. Still another aspect of the disclosed smart electronic jewelry system is the direct wireless charging capability through audio-port of the mobile device having an audio channel. Yet another aspect is charging through any available wireless power transfer device or charging through the charge port of the device, such as for example, when the smart jewelry is kept in a safe box.

Figure 2:
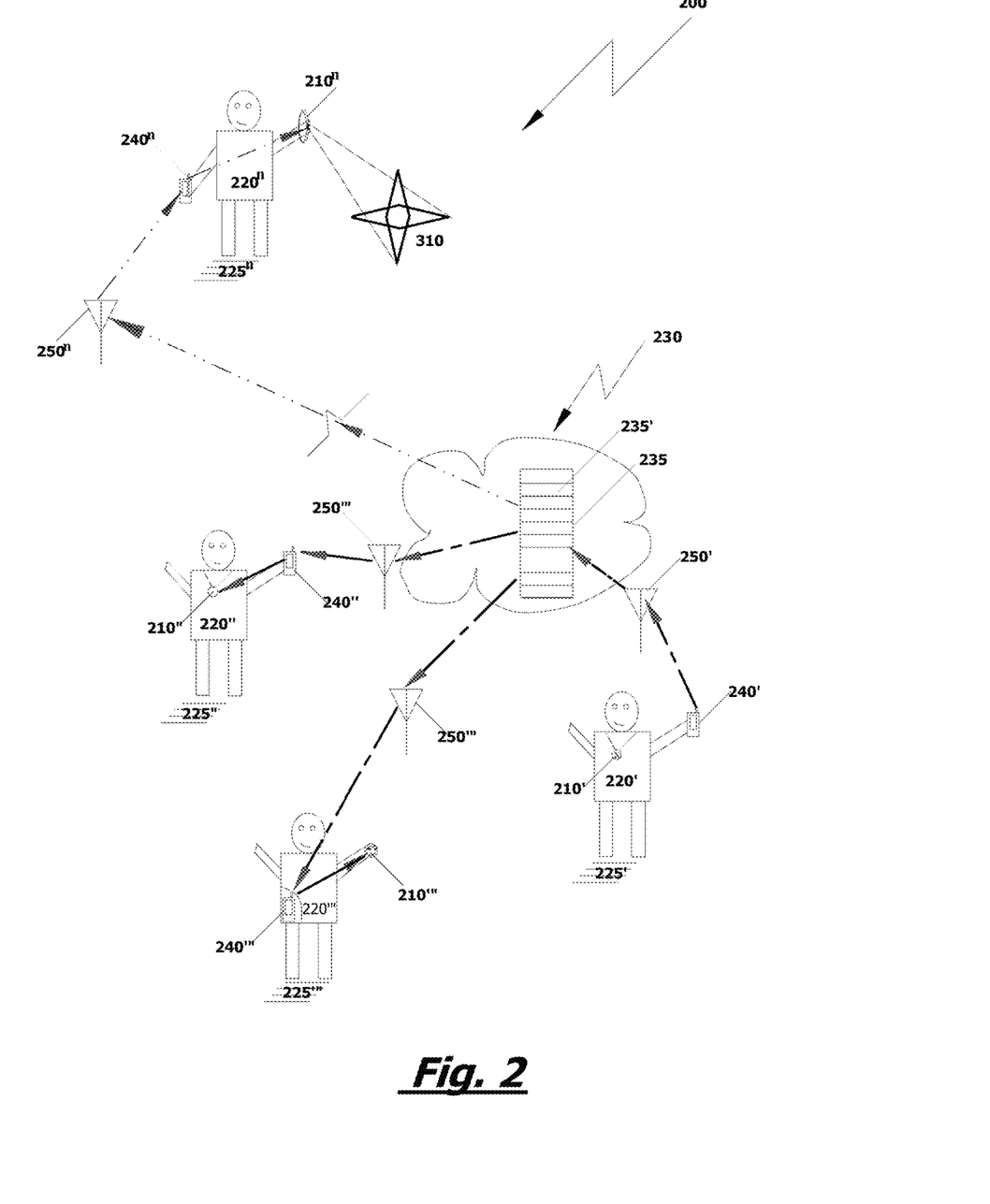
FIG. 2 shows a Smart-Gem Jewelry system connecting social network of people through a cloud based ping-blink traffic management service according to the present disclosure.

More specifically, FIG. 2 shows a plurality of components of the disclosed system 200 comprising electronically smart jewelry objects 210', 210", 210'" . . . 210″, worn or carried by at least two or more people 220', 220", 220'" . . . 220″ at their respective locations 225', 225", 225'" . . . 225″, and an associated cloud computing 230 with server 235. Persons 220', 220", 220'" . . . 220″ may have social relationships such as family, friend or fans of a club, each preferably having a mobile electronic device (smart-phone, tablet, etc.) 240', 240", 240'" . . . 240″ capable of communicating with cloud server 235.

An aspect of the disclosed system is an application software program that is shared by each of the mobile electronic devices 240', 240", 240'" . . . 240″ in order to be able to ping only each other through cloud server 235 in cloud 230. In other words, individuals with an accepted social relationship can install the common application software in their mobile devices and give each other permissions to allow pinging when desired. As an example, a user person 220' at location 225' with a mobile device 240' can create a ping through his or her user profile in the application specific traffic management cloud server 235 directed to selected profiles of say, persons 220", 220'" at locations 225", 225'" in his/her social network using the configured Smart-Gem activated jewelry 210", 210'" each having a logo/symbol that is a part of a family of logos/symbols carved on the device as explained in more detail later below. The application software of the receiving end user mobile devices 210", 210'" checks server 235 to see if there is any ping request directed to their particular Smart-Gem jewelry device or module. The connection to the specific server, such as 235 is allowed through cellular mobile access base stations 250', 250", 250'" . . . 250″ that relay the ping requests to this particular server 235. If the application program receives such a request, the software commands a translucent Smart-Gem (explained further below) in the smart jewelry activate the blinking pattern unique to a particular mood/message and lighting up the common theme symbol, say a star 310 shown in FIG. 2, carved on the smart gemstone accordingly. This local wireless connection to jewelry items can utilize any wireless communication standards such as Bluetooth or WiFi.

Figure 3A:
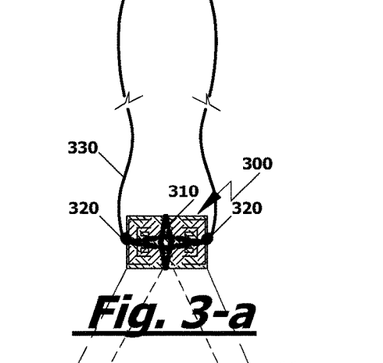
Figure 3B:
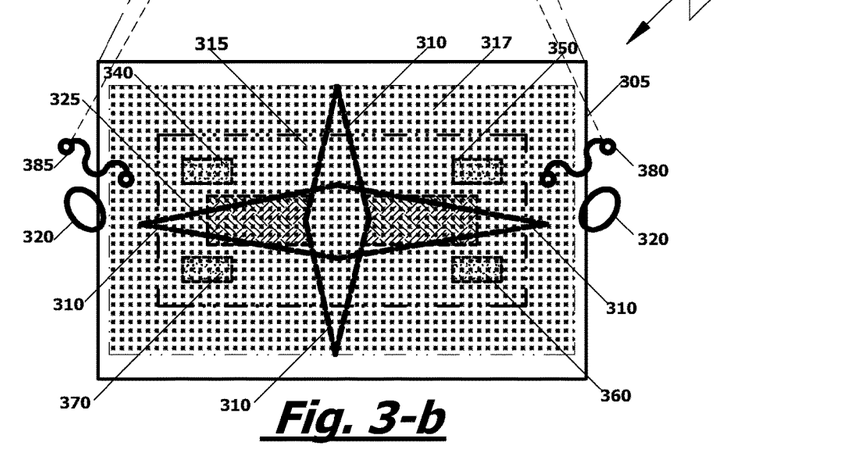

Still another aspect of the Smart-Gem Jewelry system 200 wirelessly connects a particular social network of people 220', 220", 220'" . . . 220″ through a particularly carved Smart-Gem 300 signaling a particular graphical and illuminated message (a star like appearance 310 for illustrative purposes here, as shown in both FIGS. 2 and 3-a, 3-b) that is activated by the cloud based ping-blink traffic management software 235' (shown in FIG. 2) loaded onto the cloud server 235. Smart-gem 300 itself, displaying the blinking signal message can be attached to any jewelry accessory item such as schematically shown necklaces 210', 210", ring 210'", bracelet 210″ in FIG. 2. Smart-Gem 300 comprises appurtenances 320 such as hooks that enable attachability to a carrier 330 such as a necklace, wristband and the like. It will be understood by those skilled in the art that the Smart-Gem 300 can be installed on any suitable object that can be worn or carried by the user.

Figure 3C:
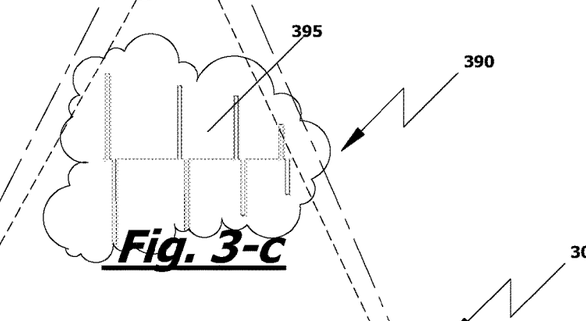
Figure 4A:
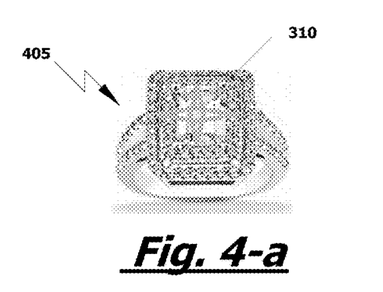
Figure 4B:
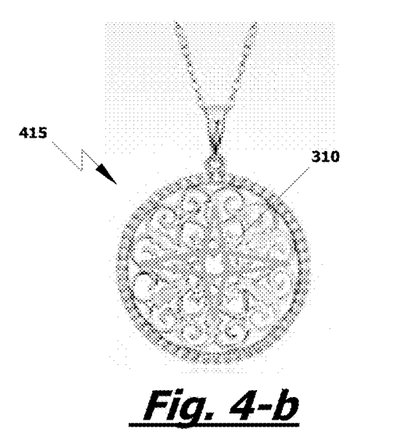
Figure 4C:
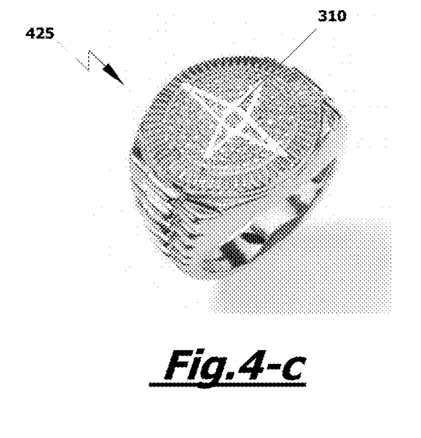
Figure 4D:
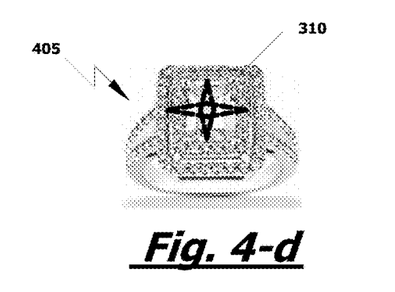
Figure 4E:
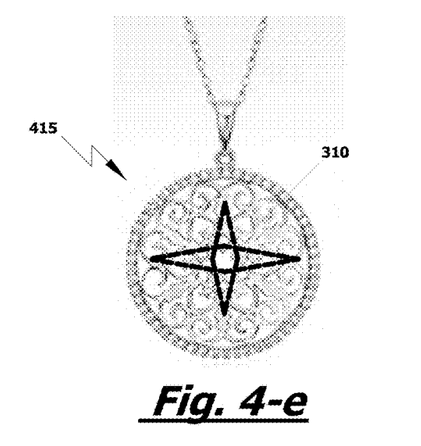
Figure 4F:
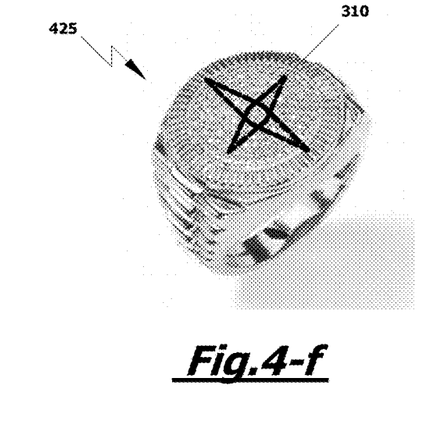
Figure 5A:
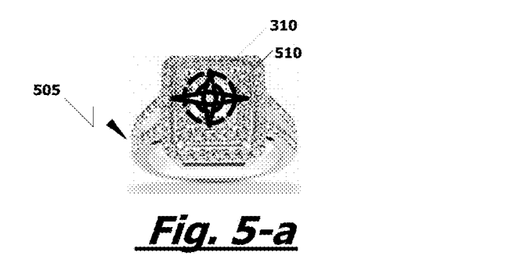
Figure 5B:
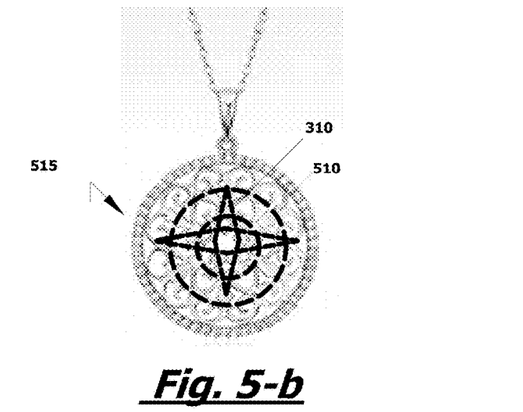
Figure 5C:
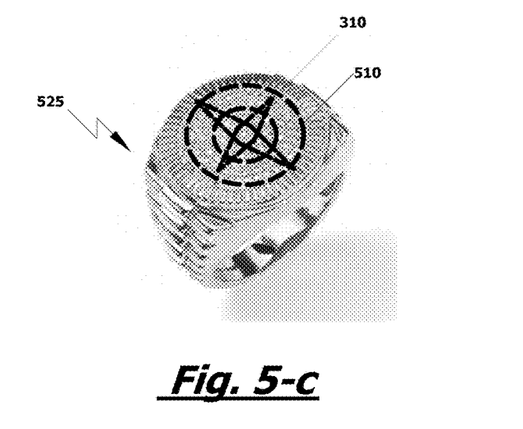
Figure 5D:
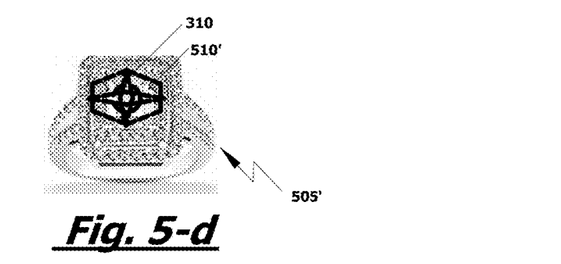
Figure 5E:
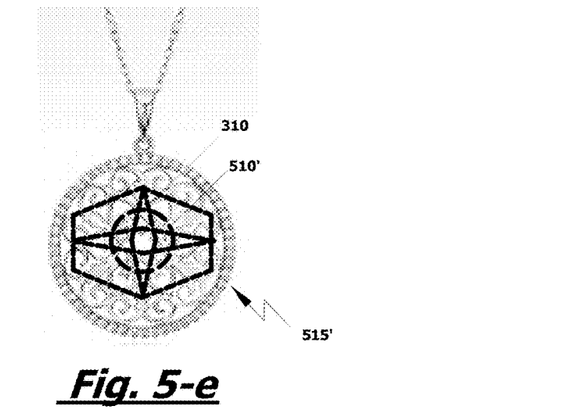
Figure 5F:
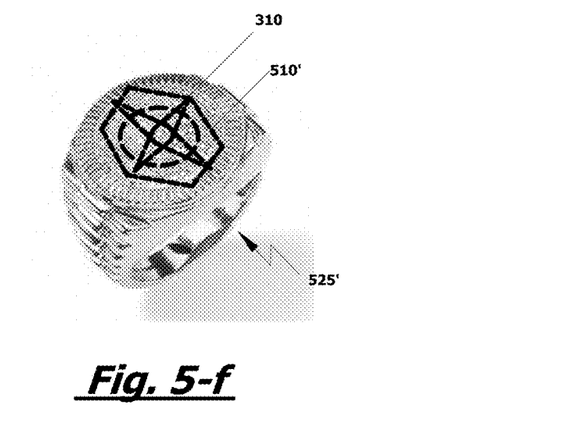

The presently disclosed Smart-Gem 300 is better seen enlarged in FIG. 3-b. Smart-Gem 300 comprises a precious or semiprecious translucent gemstone such as a garnet (not shown) cut in any desired shape, including a circular or rectangular shape 305 as shown for illustrative purposes in FIG. 3-b. Gemstone has a front side 305' (not shown) and an opposing backside 305 carved out to receive an electronic subassembly 315 comprising a circuit board including an array of Light-Emitting-Diodes (LEDs) 317 which can be patterned into a desired graphical form, such as star 310 and bi-phasic neuro-stimulus electronics with two-point contact electrodes 380 and 385 shown in FIG. 3-b touching the wearer. LEDs 317 can flash with the desired pattern and the electrodes are driven with the desired neurological electro-stimulus signals 395 in cloud 390 as shown in FIG. 3.c when commanded through any one of mobile devices 220', 220", 220'" . . . 220″ shown in FIG. 2 and paired with a wireless module 340 inside the electronic subassembly 315. The semi-transparent precious or semiprecious gemstone 300, including at least one or more appurtenances 320 is attached to jewelry and sealed. It will be evident to those skilled in the art that the translucent character of the gemstone 300 is such that it has the appearance of a desired jewelry while at the same time hiding the subassembly electronics 315. That is to say, while the backside 305 is sealed (such as with silicone rubber RTV™, not shown, but showing the two-point contact electrodes 380 and 385) front side 305' (not shown) has the opacity to hide the electronic components from view, at the same time it has the transparency to display the programmed icons as an ornament of the Smart-Gem 300.

Subassembly electronics 315 shown in FIG. 3-b further comprises a controller 340, wireless charging coils 325, solar charging cells 360 and a battery charger 370 all embedded in the stone and sealed to be a water proof smart gemstone 300 except for the two wire electrodes 380 and 385 emerging from the sealant RTV, for example, ready to be in intimate contact with the wearer as shown schematically in FIG. 3-b. When LEDs 317 are activated, light rays illuminate and expose the shared theme symbol 310, a star in this example, carved on to the visible side of the stone. It will be obvious to those skilled in the art that shared symbol 310 can be the initials of a beloved person, symbol of a constellation for a group of star gazers, a logo of a sports club or a company, shape of a common theme object (heart, flowers etc.) depending upon the common interests of each group of people. Ping-blink traffic management software 235' in cloud server 235 than directs a ping from a mobile device of a particular group as distinguished by their special symbol to the appropriate group having the same special group symbol by pinging their mobile devices 220', 220", 220''' . . . 220ⁿ shown in FIG. 2.

For illustrative purposes, FIGS. 4-a, b, c show a ring 405, a pendant 415 on a necklace, and a men's expandable bracelet 425, respectively, engraved with a logo 310, which is a star for illustrative purposes here, but in an unpinged normal dimmed state, and hence barely visible in contrast with the brilliancy of the jewel that is being worn. FIGS. 4-d, e, f, on the other hand, show the instant in which the logos 310 are lit up (in bold) the instant pinged from one of the users.

FIGS. 5-a, b, c and FIGS. 5-d, e, f, on the other hand, show the similar accessories, namely, a ring 505, a pendant 515 on a necklace, and a men's expandable bracelet 525, respectively, in pinged (that is, lit-up) state; however, FIGS. 5-a, b, c show pinging/messaging among members of one group different from the pinging/messaging taking place among the members of a different group of FIGS. 5-d, e, f, each group having a different secondary logos 510 (concentric circles) and 510' (a circle inside a polygon) superimposed on the master logo 310 (star) for all, to distinguish between the two groups within the larger group encompassing the two groups, in this illustrative case. It will be understood for those skilled in the art that there can be an infinite n number of such groups having n number of superimposed secondary logos/icons which are distinctly recognizable as secondary groups within a larger universe of all accordingly by the traffic management software 235' of cloud server 235 of FIG. 2.

In operation, a ping from a member of a group, say a sports club member is immediately directed to other members of the same group. In a further aspect of the presently disclosed Smart-Gem Jewelry System & Associated Cloud Server, traffic management program 235' is capable of pinging an emotional message, for example, across different groups by lighting up an appropriate symbol, such as happiness for a newly born baby, or sympathy for the loss of a loved one, and so on as those skilled in the art can contemplate other expressive graphics for various occasions. This feature is accomplished by superimposing still another special symbol (emoticon) for the occasion over the existing master symbol 310 commonly shared by all members of all the groups as it will be evident that the array of LEDs 317 on the electronic subassembly 315 is capable of generating any combination of graphics with various intensities and configurations. Emoticons reside in cloud server 235 and can be activated by a separate application program (not shown) provided in the mobile devices of all members of the groups having access to the cloud server 235.

Another aspect of the presently disclosed battery operated Smart-Gem 300 is the wireless charging though component 370 that is incorporated into the electronic subassembly 315 shown in FIG. 3. Wireless charging is accomplished through wireless coupling of component 370 with the associated mobile device carried by the user of Smart-Gem 300, say user 220' in position 225' in FIG. 2. The presently disclosed wireless charging of Smart-Gem 300 utilizes two different modes; namely, charging through universal audio port of the mobile device of the user, or thorough power and communication port of the mobile device of the user.

Figure 6:
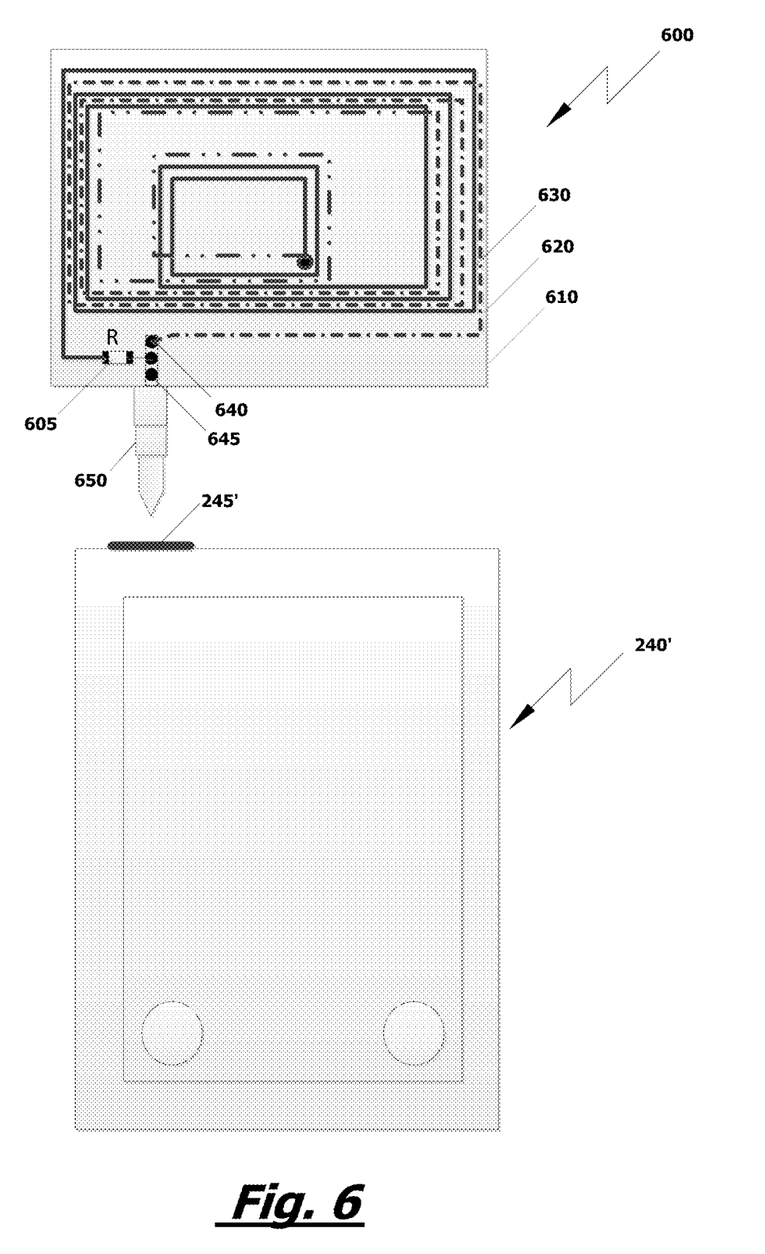
FIG. 6 shows the presently disclosed wireless charger utilizing audio port for wirelessly charging the presently disclosed Smart-Gem when coupled with a smart-phone.

FIG. 6 discloses a first portable charging device through universal audio jack port 245' of mobile device 240' of user 220' of FIG. 2. A wireless charging device 600 comprises a multi-layer circuit board 610 having planar transmission coil windings 620 (dashed lines) and 630 (solid lines), and a headphone emulation load R 605. When activated through a charging application program in mobile device 240', audio jack port 245' provides differential full swing audio-band AC signal to the left and right (640, 645) connectors on port and creates a magnetic field to be coupled to the receiver coil 350 and electronics 315 embedded in the Smart-Gem 300 of FIG. 3-b when placed on charging device 600. The full-strength artificial audio signal that is fed into the headphone audio drivers of the phone, tablet or any other type of mobile electronic device with headphone jack port, say a full-swing 10 KHz sine tone swinging in positive signal polarity at the right channel of the stereo and opposite polarity negative signal at the left channel of the stereo creates large current into an headphone emulation load formed by the series combination of R 605 and the multi-layer charging coil 620 and 630 of FIG. 6. In this manner, largest amount of current possible is drawn from the driver combining the drive strengths from both the left and right stereo channels by emulating a real headphone load but in reality serving another purpose; namely transferring the power to the smart-gem. Thus, with the presently disclosed left-channel and right-channel opposite polarity drive scheme, since the applied signal is arranged to be a differential opposite signals, ground port of the audio jack is not even needed. Both channels use the same ground reference on the phone board (not shown). It will be obvious to those in the art that the two-layer printed circuit board (PCB) 610 can include many more layers of windings and ferrite material coating to increase the power transfer efficiency to the power receiving Smart-Gem 300. Efficient external coils with many more windings rather than the embedded planer PCB coils may also be employed to maximize the charging efficiency and speed.

Figure 7:
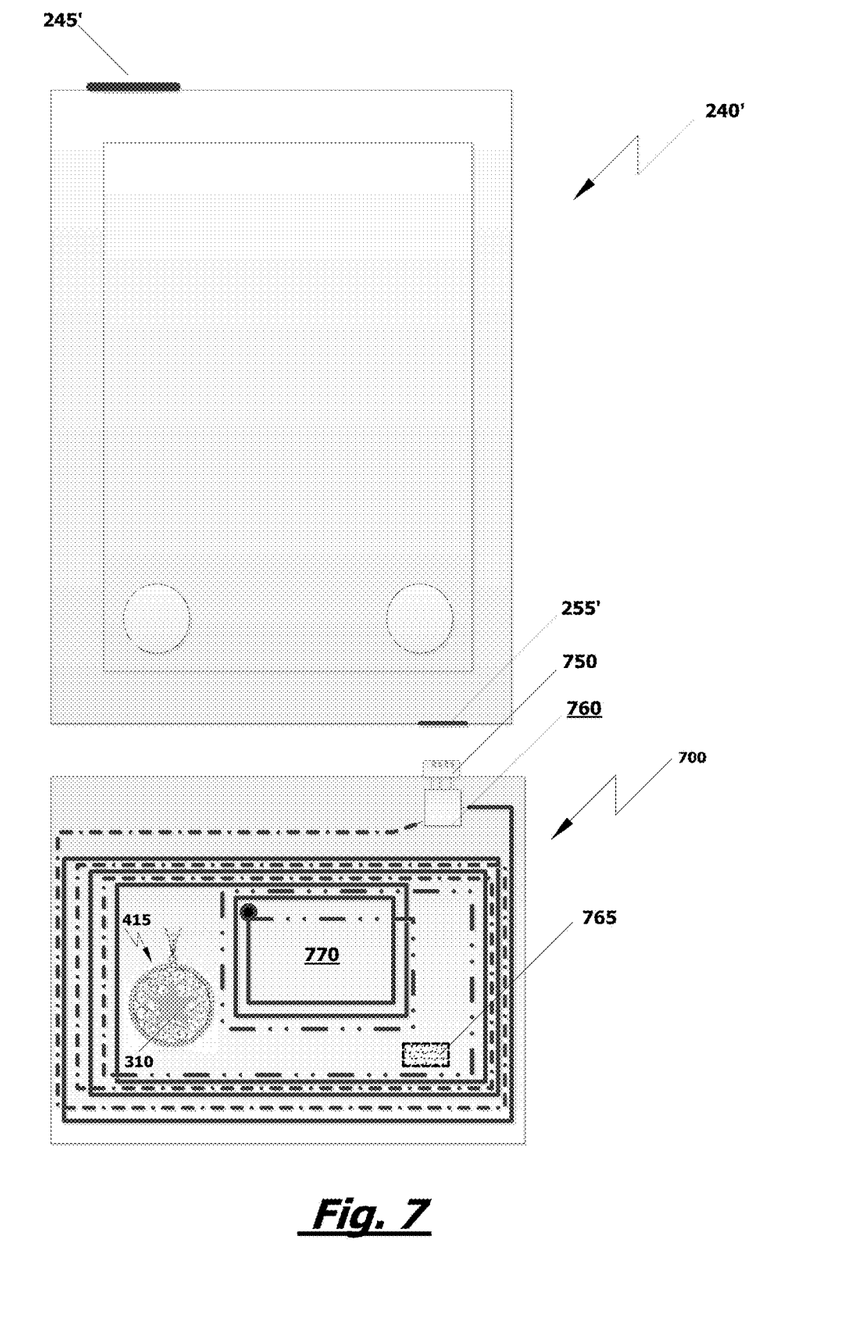
FIG. 7 shows the presently disclosed wireless charger utilizing power and communication port of a mobile device for wirelessly charging the presently disclosed Smart-Gem when placed on the disclosed wireless charger.

FIG. 7 discloses a second portable charging device 700 that connects directly to the power and communication port 255' of mobile device 240' through a matching male connector 750. The charging electronic circuits 760 generate the drive waveforms by additional power circuitry that taps into battery 765 of the device directly and generates the necessary AC drive current into the multi-layer planar PCB coil 770 to wirelessly charge the disclosed Smart-Gem 300.

Figure 8:
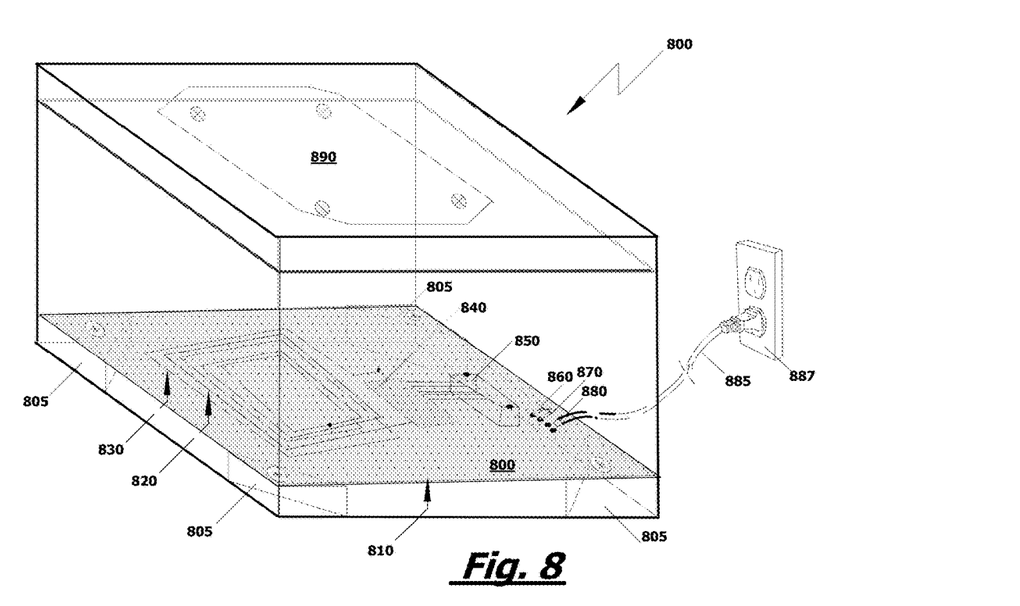
FIG. 8 shows the presently disclosed jewelry storage box fitted with electronics to charge wirelessly the presently disclosed Smart-Gem when simply dropped inside the box for storage.
Figure 9:
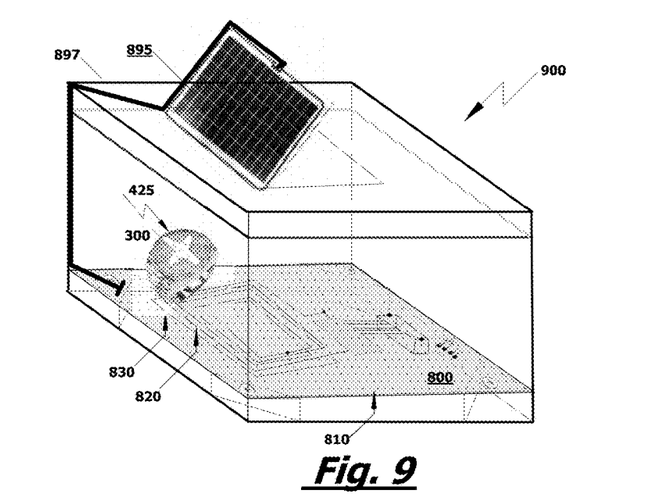
FIG. 9 shows the presently disclosed jewelry storage box having solar cells on its lid and fitted with electronics to charge wirelessly the presently disclosed Smart-Gem when simply dropped inside the box for storage.

A jewelry storage box 800 shown in FIG. 8 provides further convenience in keeping the presently disclosed Wireless Charging Smart-Gem 300 charged automatically when it is placed or dropped from an opening having a lid 890 into the box for storage as shown in FIG. 9. The electronically configured jewelry storage box 800 shown schematically in FIG. 8 comprises a multi-layered printed circuit board (PCB) 810 secured on four pedestals 805 installed at four corners of the rectangular box. It will be evident to those skilled in the art that the box can be made of any desired material such as wood, metal, glass with lining, etc., and the shape of the box can be circular, octagonal or any other shape, and the raised floor secured onto pedestals 805 can be accomplished in many other different ways which will not be discussed here further in order not to unnecessarily obscure the present disclosure of the box. Furthermore, the electronic circuits are printed and components mounted on the bottom side 810' of the Printed Circuit Board, as depicted under a shaded surface 810. It will be noted that top surface 810 does not include any electronic components to allow smooth surface where the wirelessly chargeable Smart-Gem 300 jewelry can be placed or simply dropped onto (FIG. 9). If desired, the wireless power transmit coil winding traces 820 and 830 shown to be two layers can be printed on the top surface 800 since they are very thin so as to not incur any rough surface, although they are shown here towards the bottom surface 810 for illustrative purposes. The charging electronics 840, universal micro-USB (not shown) or any other universal female power connector 850, turn-ON and LED switches 860, 870, respectively, are placed on the back surface 810 of the PCB 800 where socket openings 880 are provided for a universal wall charger (not shown) to have access to a wall outlet 887. The electronically configured jewelry box 800 as presently disclosed in FIG. 8 can be disconnected readily by pulling the electrical cord 885 from the wall outlet 887, or disconnecting cord 885 from the socket openings 880 on the side of the jewelry box. It will be known to those skilled in the art that if desired, an additional pushbutton switch can be used to activate or deactivate the box charger.

A further aspect of the jewelry box 900 is shown in FIG. 9 wherein lid 890 of the box is fitted with a solar panel 895 and associated energy lines 897 that connect the solar panel 895 to the electronic subassembly 810 of jewelry box 800 of FIG. 8. The user can always unplug box 900 fitted now with a solar panel lid from the wall 887 and carry the jewel box anywhere to expose its solar panel 895 to sunlight so that the battery (not shown) in box 800/900 can recharge for wirelessly recharging a Smart-Gem 300 with its associated jewelry, such as men's expandable bracelet 425 is dropped into the box shown in FIG. 9 anytime and anywhere.

Though these numerous details of the disclosed device have been set forth here, such as electronic components installed or embedded into a gemstone and associated wireless chargers including energy captured from solar cells of the presently disclosed Wireless Charging Smart-Gem Jewelry System & Associated Cloud Server, it is to be understood that these details of the present disclosure have been described by way of illustration and not limitation. It will be obvious to those skilled in the art that there are other specific details which are inherent in the Smart-Gem, such as, for example, the device can be made to operate on a private mode where only confidential information may be displayed by the clicking of a special icon or can be put on a public mode by clicking the same or another icon for, say, displaying the time of the day, weather or other public information that is readily available elsewhere. The device can also be programmed to go to public mode after a set time when not in use. Furthermore, a code can also be entered remotely to move from one mode to another for security purposes.

While the disclosed invention has been particularly shown and described with reference to a particular embodiment(s) or aspect(s), it will be appreciated that variations of the above-disclosed embodiments(s) and other features and function, or alternatives thereof, may be desirably combined into many other different systems or applications Also that various presently unforeseen and unanticipated alternatives, modifications, variations or improvements therein may be subsequently made by those skilled in the art which are also intended to be encompassed by the following claims.

What is claimed is:

1. A Wireless Charging Smart-Gem Jewelry System and Associated Cloud Server comprising
    an electronic gemstone having a front side and an opposing backside, said backside carved to receive electronic components with capability to flash signals of pre-defined forms through said front side while the backside is sealed;
    a plurality of electronic devices paired with at least one or more of said electronic gemstones;
    an application software program loaded onto said plurality of electronic devices with instructions to recognize and ping said at least one or more of said electronic gemstones;
    a cloud server having a traffic control program for directing ping traffic emanating from said plurality of electronic devices;
    a wireless charger capable of wirelessly charging said electronic gemstone by mating with said electronic devices;
    wherein the charger is a portable jewelry storage box capable of mating with a mobile device to wirelessly charge the electronic gemstone placed inside the sotorage box;
    wherein the pre-defined forms comprise a multi-layered combination of two or more icons being lit up simultaneously representing membership in a specific group within a general membership; and
    wherein said at least two or more of said electronic gemstones and said paired plurality of electronic devices directed by a cloud server form a social network system where groups of users of said electronic gemstones can communicate to each other their feelings through flashing emoticons as well as through electro-stimulation achieved by bi-phasic neural stimulus waveforms that are generated through electronics embedded in said Smart-Gem Jewelry.

2. The Wireless Charging Smart-Gem Jewelry System according to claim 1, wherein said electronic gemstones are translucent to show said flash signals on said front side.

3. The Wireless Charging Smart-Gem Jewelry System according to claim 1, wherein said electronic gemstones are carved out on said backside to receive said electronic components.

4. The Wireless Charging Smart-Gem Jewelry System according to claim 1, wherein said electronic gemstones have opacity on the front side to hide said electronic components.

5. The Wireless Charging Smart-Gem Jewelry System according to claim 1, wherein said electronic components comprise an assembly of LEDs, charge and receive coils, solar cells, battery charger, body sensor electrodes and a controller.

6. The Wireless Charging Smart-Gem Jewelry System according to claim 1, wherein said pre-defined forms comprise special graphic icons lit up singly by said assembly of LEDs as an indication of general membership to a group of people.

7. The Wireless Charging Smart-Gem Jewelry System according to claim 1, wherein said application software program is coded to ping said plurality of electronic devices which in turn flash said icons in said gemstones.

8. The Wireless Charging Smart-Gem Jewelry System according to claim 1, wherein a plurality of sealed electrodes from said backside of said Smart-Gem to provide an electro-neurological stimulus sensation on said user's body with bi-phasic neural stimulus waveforms that are generated through electronics embedded in said Smart-Gem communicated to the user via the cloud.

9. The Wireless Charging Smart-Gem Jewelry System according to claim 1, wherein said charger is capable of wirelessly charging said electronic gemstone by mating with audio or power port of said electronic device.

10. The Wireless Charging Smart-Gem Jewelry System according to claim 1, wherein said charger capable of wirelessly charging said electronic gemstone is itself energized by solar panels.

* * * * *